Oct. 23, 1956   W. SEDUTTO   2,767,664
APPARATUS FOR FORMING FROZEN CONFECTIONS
Filed May 19, 1955
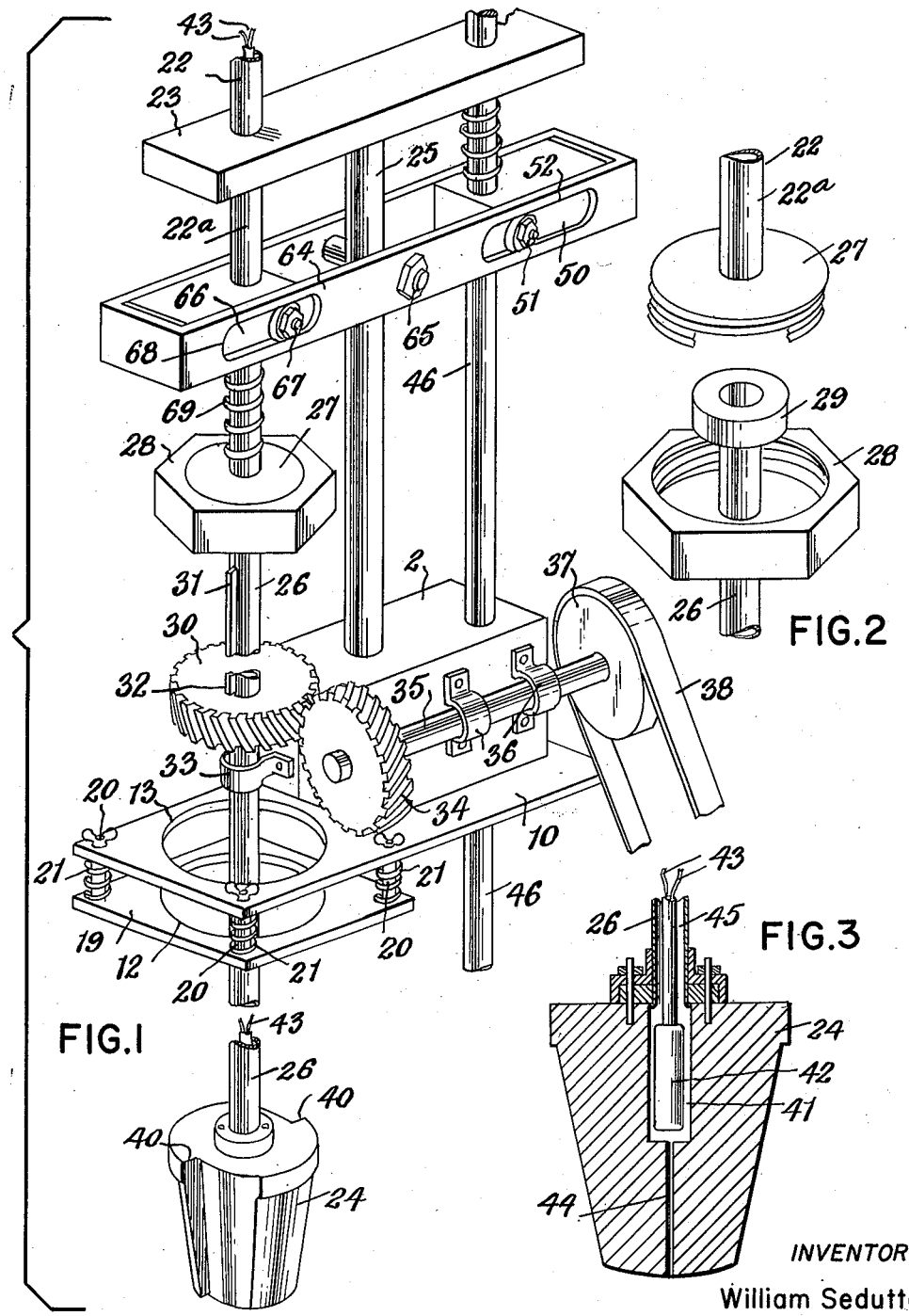
INVENTOR.
William Sedutto
ATTORNEY United States Patent Office 2,767,664
Patented Oct. 23, 1956

2,767,664

APPARATUS FOR FORMING FROZEN CONFECTIONS

William Sedutto, New York, N. Y.

Application May 19, 1955, Serial No. 509,653

5 Claims. (Cl. 107—8)

This invention relates to an apparatus for forming frozen food products, such as ice cream, water-ice, sherbet, custard and the like in individual servings or units and particularly when such servings or units are to be composed of different flavors, or composed of a combination of different substances. An apparatus of the general character of that to which the present invention relates, is shown in my Patent No. 2,703,538, dated March 8, 1955.

It is an object of the present invention to provide a means by which the filling of cups or other forms of receptacles or molds will be speedily performed, and in a manner to permit of the filling of a plurality of different flavors or different materials into the molds or cups.

In my above-mentioned patent, it is suggested that a heating forming die be forced down into the contents of a cup or mold to thereby form a cavity in the contents, the die being thereupon withdrawn while an air blast is directed through the die and into the cup to aid in breaking a vacuum in the cavity and tending to hold the formed cavity against collapse while the forming die is being withdrawn. I have ascertained that the action of a cavity-forming die is materially improved by rotating the die while it descends into the cup or mold and is brought into contact with the contents of it, and while it is being withdrawn. I have found also that the formed cavity is made cleaner in outline and that the ice cream or other frozen material in the cup or mold is freed from contact with the forming die and will not be carried out of the mold or cup thereby when the die rises out of the mold or cup.

It is another object of the invention to provide means by which the speed of formation of the cavities will be greatly increased, thus materially aiding in the production of the frozen product.

It is still another object of the invention to provide a speedy, economical means for filling molds with different substances, and particularly by the use of a rotating die which forms a cavity in one substance in the mold for the reception of a second substance, thus enabling a composite body of the frozen product to be produced for serving in a package which does not require re-packaging after the completion of the filling process, and to provide a continuous process by which the composite servings can be speedily, sanitarily and uniformly produced.

With these and other objects to be hereinafter set forth in view, I have devised the arrangement of parts to be described and more particularly pointed out in the claims appended hereto.

In the accompanying drawing, wherein an illustrative embodiment of the invention is disclosed, Fig. 1 is a perspective view of an apparatus constructed in accordance with the invention;

Fig. 2 is a perspective view of the structure of the forming-die shaft, showing the coupling for the rotative and non-rotative sections of said shaft; and Fig. 3 is a vertical sectional view through the forming die.

As is fully described in my Patent No. 2,703,538, the cup or mold containing the frozen material into which a cavity is to be formed, is supported below the forming die shown at 24. The cup or mold may be supported on a conveyor or it may be stationarily supported on any suitable rest directly below the forming die 24 so that the die will, upon its descent, enter into the cup and form the central cavity therein.

The plunger form forming a cavity in a partially-filled mold or cup includes a vertically reciprocable piston rod or plunger 22 vertically guided through a guide plate 23 fixed at the upper end of a vertical post 25 having its lower end secured in a block 2 mounted on base plate 10. The piston rod or plunger 22 is formed in two sections, namely, the upper non-rotative section indicated at 22a and the lower section indicated at 26, the latter section being both rotatable and vertically-reciprocable and carrying the forming die 24 at its lower end so that the forming die is rotatable with it.

The section 22a is provided at its lower end with a threaded disk 27 which is threadable with a cap-nut 28 through which the piston rod section 26 is slidable and within which said section of the rod is rotative. At its upper end, the rotative section 26 is provided with a disk-shaped head 29 freely rotative within the nut 28. This arrangement is such that while the two sections 22a and 26 of the piston rod 22 are coupled together by parts 27, 28 and 29, the section 22a is non-rotative while that shown at 26, and carrying the forming die 24, is rotative by means to now be described.

Mounted on the rotative section 26 of the piston rod is a gear 30, rotatively supported by an extended part of the block 2, and which part is not visible in Fig. 1 as it appears below the gear. The portion 26 of the piston rod is vertically slidable through the gear 30 but is rotated by the gear due to the spline 31 that is formed on the rod section 26, being in engagement with a complementary slot 32 formed in the gear. Rod section 26 is supported by and is rotative within a suitable bearing 33 supported by the block 2, which bearing is shown in a simple form but which may be an anti-friction bearing of any suitable character.

The gearing 30 is in mesh with a driving gear 34 secured on a rotated shaft 35, that is rotative in the bearings 36 of any suitable anti-friction type, supported by block 2. Shaft 35 carries a pulley 37 over which a belt 38 extends, the belt extending from a pulley on the shaft of a motor or other suitable source of power by which the shaft 35 is driven. It will be apparent that by means of the structure described, the rotative portion 26 of the piston rod 22 will be rotated, and thus when the forming die 24 is located within a mold cup, said forming die will be rotated and will rotatively form a cavity in the contents of the mold cup. The forming die 24 is detachably secured to the part 26 by the connection 55 and is formed with the radial wings 40 to facilitate in the formation of the cavity in the mold contents; to act as scraping elements, and to cause the frozen material to be forced outwardly and against the walls of the cup to thus provide a clean, sharply-defined cavity.

The forming die 24 is formed with a centrally-located chamber 41 in which a heating unit 42 is located, said heating unit being connected to a source of current by means of wiring 43 extending upwardly through it. The wiring and heating unit are rotative with the part 26 of the piston rod, the ends of the wiring being connected to a source of current by suitable sliding contacts of known form which permit of the rotative movement above described.

Extending through the forming die 24 is an air passage 44 connected to the hollow interior 45 of the part 26 of the piston rod. The upper end of the non-rotative part 22a of the piston rod is connected to a source of air under pressure so that at the proper time an air blast will be directed down through the piston rod and out of the bottom of the forming die 24 in a manner similar to that shown and described in my Patent No. 2,703,538. The control of the air flow is had by means of a push rod 46 vertically slidable through the block 2 and having its upper end provided with a head or tappet which opens an air valve at the proper time to allow the air to flow down through the piston rod 22 at the proper time and out of the lower end of the forming die 24. The push rod 46 is operated by a cam not shown, but similar to that described in my Patent No. 2,703,538. When this rod 46 is elevated by the action of such cam, the piston rod 22 will be moved downwardly, and this result is attained by the use of the rocker bar 64. This rocker bar 64 is pivoted at a central point on the pivot pin 65 supported in the fixed post 25. Fixedly secured to the piston rod 22 is a lug 66 which carries a pin 67 projecting through a longitudinal slot 68 formed in the rocker bar 64. The push rod 46 also carries a lug 50, provided with a pin 51 which extends through a longitudinal slot 52 formed in the rocker bar 64. A coil spring 69 surrounds the part 22a of the piston rod 22 and a similar coil spring surrounds the upper portion of the push rod 46.

Located below a base plate 10 on which the block 2 is mounted, is a spring-pressed pressure plate 19, which is supported by four pins 20. The mold cup has its rim in abutment with the pressure plate 19 when the cup is placed beneath it. The coil springs 21 which surround the pins 20 resiliently resist the raising movement of the plate 29 when the mold cup is elevated. The spring-pressed plate 19 also tends to urge the mold cup away from the forming die 24 as the support for the mold cup is lowered and as the forming die 24 is moved upwardly and out of the cavity formed by it in the contents of the mold cup. The plate 19 is formed with a circular opening 12 and a similar opening is provided at 13 in the base plate 10 and the forming die 24 passes through these aligned openings 12 and 13 in its raising and lowering movements.

From the foregoing, the operation of the improved apparatus will be readily understood. The molds are usually in the form of metal cups of desired shape and size, and the same are moved along on a belt or other conveyor to a filling station where the same each receive a charge of ice cream or other frozen product to partially fill the cup. Each partly-filled cup is then carried by the conveyor to a point below the forming die 24 to successively present the cups in position to enable a cavity to be formed in the ice cream or frozen product in each cup by the descent of the rotating forming die 24 into the cup. After the die is inserted to the required depth and is about to start an upward or receding movement, a blast of air will be ejected through the opening 44 into the cavity formed in the contents of the cup. This air blast will tend to break the vacuum in the cavity and will destroy adhesion between the forming die and the ice cream or other frozen product in the cup, and will tend to hold the formed cavity against collapse while the forming die is being withdrawn. The rotating forming die will produce a cleanly-formed cavity; will withdraw from the cavity without tending to carry away portions of the ice cream, and will tend to direct displaced parts of the ice cream against the walls of the mold.

Having described an embodiment of the invention, it is obvious that the same is not to be restricted thereto, but is broad enough to cover all structures coming within the scope of the annexed claims.

What I claim is:

1. In apparatus for forming a cavity in the contents of a mold cup, comprising a vertically disposed upper shaft member, a lower shaft member vertically disposed beneath and in endwise axial relation to said upper shaft member, a forming die mounted on the lower end of said lower shaft member, coupling means securing the adjacent end portions of said upper and lower shaft members, said coupling means including means for providing free rotation about the vertical axis of the lower shaft member with respect to the upper shaft member, lower guide means mounted about said lower shaft member, means between each of said guide means and its respective shaft member for permitting vertical reciprocation of one through the other, means for rotating said lower guide means and its shaft member about the vertical axis thereof and means for reciprocating said upper shaft member, whereby the forming die can be either lowered into, or raised from a mold cup disposed therebeneath and rotated while positioned in the mold cup.

2. In an apparatus as provided for in claim 1, wherein both the upper shaft member and the lower shaft member are provided with an air passage, the forming die having an air passage in communication therewith, and means for supplying heat to the forming die, said heating means being rotative in company with the forming die.

3. In an apparatus as provided for in claim 1, wherein there is provided means for forcing air at a predetermined time through the shaft members and rotating mold cup, the forming die having an aperture through which the air is directed into the cavity in a frozen product contained within the mold cup, and means for heating the forming die, said heating means being rotative with the die.

4. In an apparatus as provided for in claim 1 wherein the upper shaft member is non-rotative and reciprocable and the forming die is provided with an extended wing portion acting as a scraping surface.

5. In an apparatus for forming a cavity in the contents of a mold cup, comprising a vertically disposed upper shaft member, a lower shaft member vertically disposed beneath and in endwise axial relation to said upper shaft member, a forming die mounted on the lower end of said lower shaft member, coupling means securing the adjacent end portions of said upper and lower shaft members, said coupling means consisting of a hollow member on one of the shaft members in which the end of the second shaft member is rotative, said end carrying a head disposed inside of and rotative within the hollow member, said coupling providing free rotation about the axis of the lower shaft member with respect to the upper shaft member, lower guide means mounted about said lower shaft member, upper guide means mounted about said upper shaft member, means between each of said guide members and its respective shaft member, for permitting vertical reciprocation of one through the other, means for rotating the lower guide means and its shaft member about the vertical axis thereof, means for reciprocating said upper shaft member whereby the forming die can be either lowered into, or raised from a mold cup disposed therebeneath and rotated while positioned in the mold cup and means for heating the forming die.

References Cited in the file of this patent
UNITED STATES PATENTS

| 1,834,474 | Ringl | Dec. 1, 1931 |
| 2,212,991 | Sobel | Aug. 27, 1940 |
| 2,703,538 | Sedutto | Mar. 8, 1955 |